N. E. AUSTIN.
IRRIGATION DEVICE.
APPLICATION FILED AUG. 20, 1909.
966,069.                                                    Patented Aug. 2, 1910.
Fig. 1.
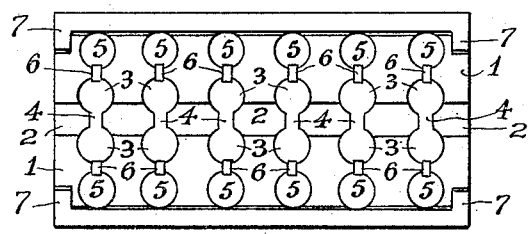
Fig. 2.
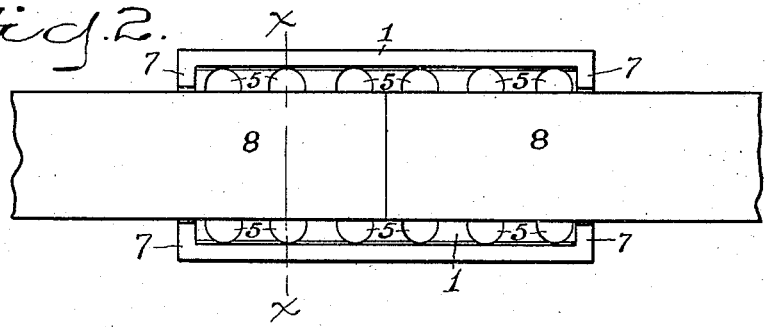
Fig. 3.
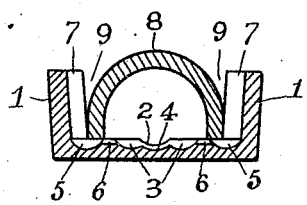
Fig. 4.    Fig. 5.    Fig. 6.
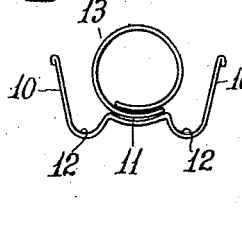 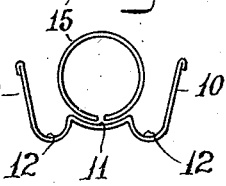
Witnesses:                                                Inventor
H. A. Lamb,                                           Nelson E. Austin.
M. J. Lougden                                By Attorney

UNITED STATES PATENT OFFICE.

NELSON ELLIS AUSTIN, OF DANBURY, CONNECTICUT.

IRRIGATION DEVICE.

966,069. Specification of Letters Patent. Patented Aug. 2, 1910.

Application filed August 20, 1909. Serial No. 513,857.

*To all whom it may concern:*

Be it known that I, NELSON ELLIS AUSTIN, a citizen of the United States, residing at Danbury, in the county of Fairfield and State of Connecticut, have invented certain new and useful Improvements in Irrigation Devices; and I do hereby declare the following to be a full, clear, and exact description of the invention, such as will enable others skilled in the art to which it appertains to make and use the same.

My invention relates to certain improvements in irrigation devices, and consists in the construction and arrangement of parts such as will be hereinafter fully described and then particularly pointed out in the claim which concludes this description.

In the accompanying drawing which forms a part of this application Figure 1 is a detail plan view of the open trough which I prefer to employ—Fig. 2 a plan view of the completed device as it appears when in position for use—Fig. 3 a section at the line *x*, *x*, of Fig. 2, and Figs. 4, 5, and 6, are end elevations of modified forms of my improvement.

Similar numbers of reference denote like parts in the several figures of the drawing.

My improvement, generically speaking, comprises an open trough which has a waterway in the bottom extending lengthwise thereof, and a hollow structure supported within said trough in such manner as to cover the waterway and afford a roof so that when the device is placed underground and covered with soil the latter will be held by the roof away from the waterway so as not to obstruct the same, a space being left between the sides of the trough and the hollow structure so that the soil will be deposited within said space, whereby the water will flow from said waterway beneath the bottom edges of said structure and will moisten the soil, the moisture being drawn up and disseminated throughout the surrounding soil by capillary attraction.

Referring to Figs. 1, 2, and 3, 1 is the open trough which is made in suitable lengths that are abutted together and secured in any suitable manner so as to form a continuous trough. I have illustrated only one length of trough since further illustration in this respect would be mere duplication.

2 is the waterway extending lengthwise throughout the bottom of the trough and 3 are catch basins that are slightly deeper than the waterway, and which communicate with the latter by means of passages 4. Beyond these catch basins 3 and near the sides of the trough is a second series of catch basins 5 which communicate with the first named catch basins by means of passages 6, the depth of these catch basins 5 being likewise greater than that of the waterway.

At the ends of each trough are inwardly extending abutments 7. 8 are the hollow roof-like structures which are placed within the trough in the manner shown at Fig. 2, so that each structure is firmly held between the abutments 7 while a space 9 is left between the sides of the trough and the hollow structure. This structure as shown at Fig. 3 is of a general semi-circular shape and bridges the waterway and the inner catch basins, and it will be clear that when the improvement is placed underground and covered with soil the latter will be held away from the waterway thus allowing a free circulation of water and air while the soil can be packed between the sides of the trough and said structure. Water is introduced in any suitable manner at one end of a system of these troughs within the waterway, and will flow therethrough and be distributed throughout the catch basins so that it will reach the soil at the sides of the trough and thence be drawn up and disseminated throughout the surrounding earth by capillary attraction.

The construction heretofore described relates to the embodiment of my invention in tile form, but in the modifications shown at Figs. 4, 5, and 6, I have shown various forms of my improvement made from sheet metal, which I will now briefly describe. Referring to these Figs. 4, 5, and 6, 10 is the trough having the waterway 11 in the bottom thereof and the slightly deeper catch basins 12 at the sides of the trough. At Fig. 4 I have shown a hollow roof-like structure 13 which is tubular in shape and has its extremities overlapped and slightly separated. This structure 13 rests upon the waterway in the manner shown, so that when water is introduced within such structure and into said waterway it will flow into the catch basins through the opening between the ends of the structure and also over the sides of the waterway into the soil which is packed between the sides of the trough and the waterway. In Fig. 5 the waterway is projected by a dome-like structure 14 whose extremities are partly curled and disposed in proximity to the catch basins so that water will flow from the waterway over the sides thereof into the catch basins for the purpose heretofore described. At Fig. 6 I have shown a tubular structure 15 which rests upon the waterway and is open at the bottom, so that water introduced within said structure and waterway will flow into the catch basins in the manner heretofore described. In all of these several modifications shown at Figs. 4, 5, and 6, there is a space between the sides of the trough and the hollow structures that protect the waterway so that placed underground the soil may be packed within the trough so as to receive the moisture from the catch basins.

Having thus described my invention what I claim as new and desire to secure by Letters Patent is:—

The herein described improvement in irrigation appliances, comprising a trough having a waterway with catch basins communicating therewith, and a hollow structure supported within said trough out of contact with the sides thereof and acting as a roof to prevent the surrounding soil from clogging said waterway and at the same time permitting the soil to be packed between said structure and the sides of the trough so that water may flow from said waterway into the catch basins at the sides of the trough and thence be drawn up and disseminated into the surrounding soil by capillary attraction.

In testimony whereof I affix my signature in presence of two witnesses.

NELSON ELLIS AUSTIN.

Witnesses:
GEO. WAKEMAN,
E. S. FAIRCHILD.